(No Model.)  N. L. RABER.  3 Sheets—Sheet 1.
AMALGAMATOR.
No. 536,893.  Patented Apr. 2, 1895.
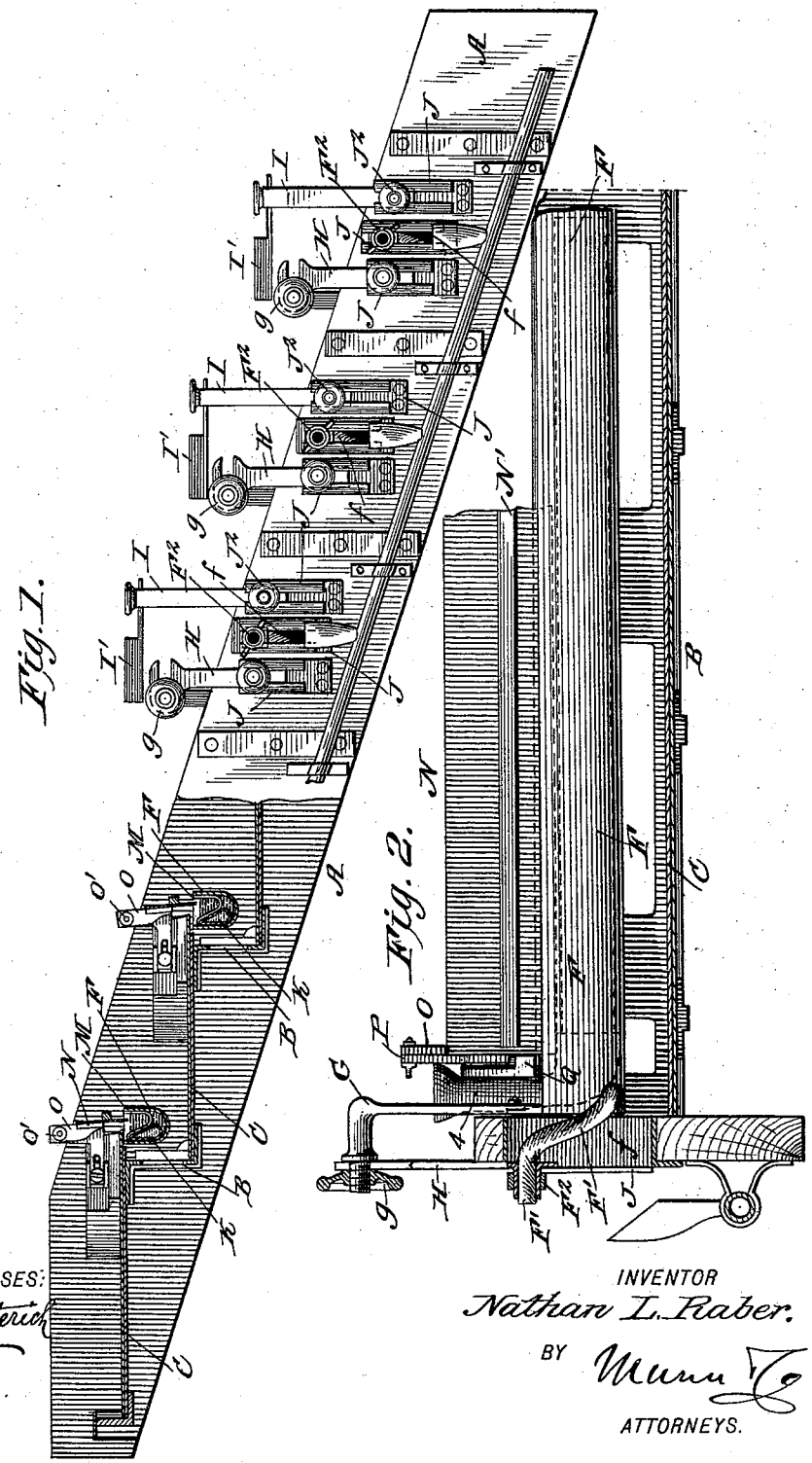
WITNESSES:
Fred G. Dieterich
P. B. Turpin
INVENTOR
Nathan L. Raber.
BY Munn & Co
ATTORNEYS.

(No Model.) 3 Sheets—Sheet 2.
N. L. RABER.
AMALGAMATOR.
No. 536,893. Patented Apr. 2, 1895.
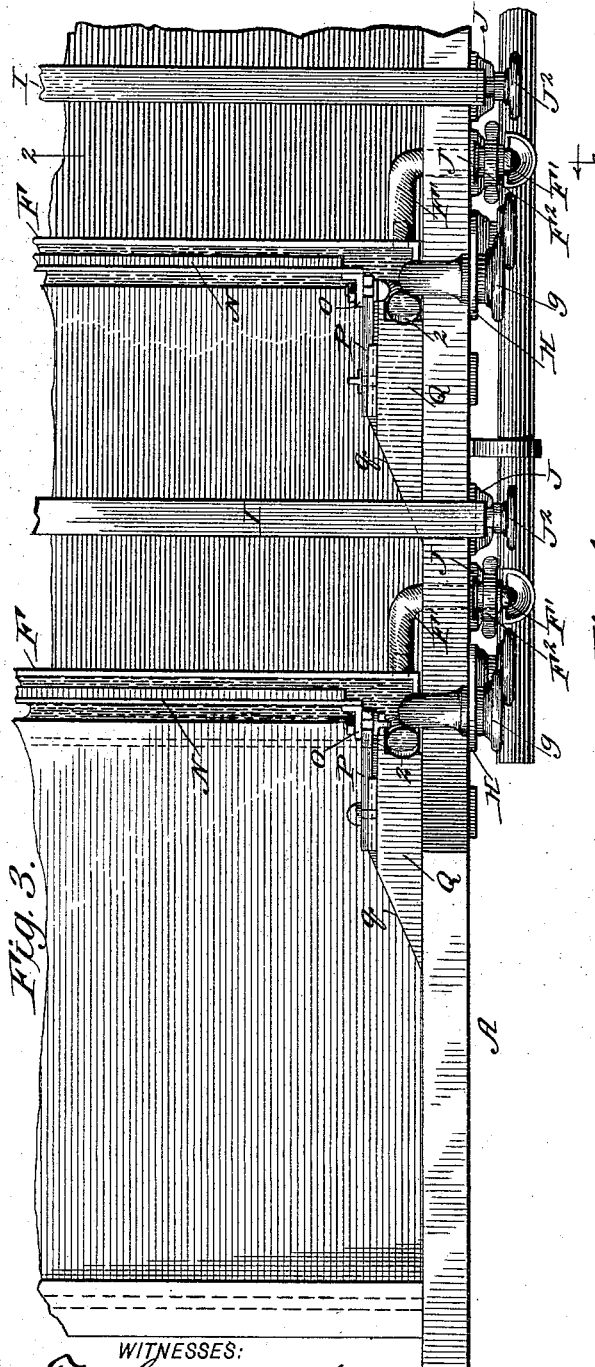
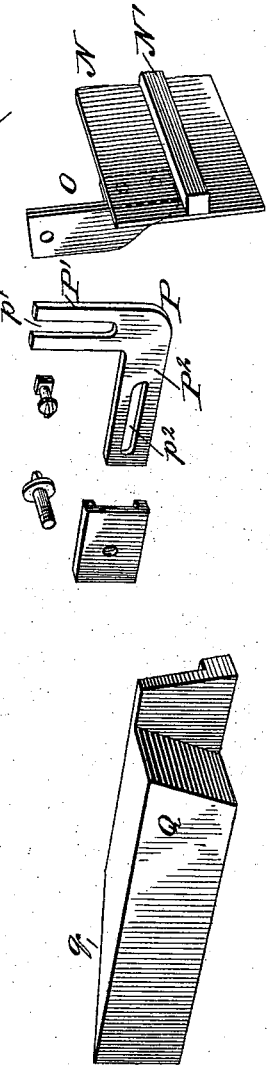
WITNESSES:
Fred G. Dieterich
P. B. Turpin
INVENTOR
Nathan L. Raber.
BY Munn & Co
ATTORNEYS.

(No Model.) 3 Sheets—Sheet 3.
N. L. RABER.
AMALGAMATOR.
No. 536,893. Patented Apr. 2, 1895.
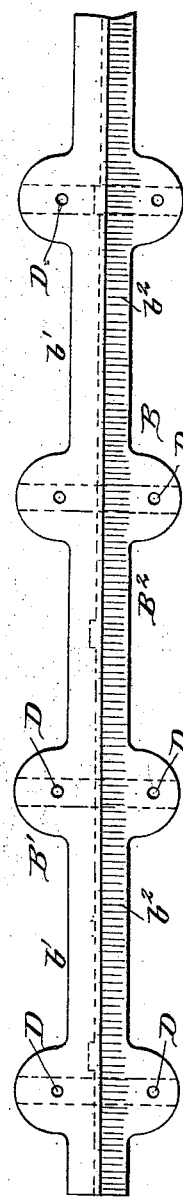
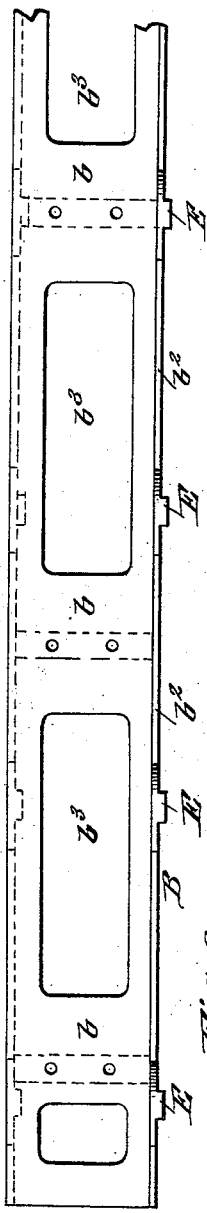
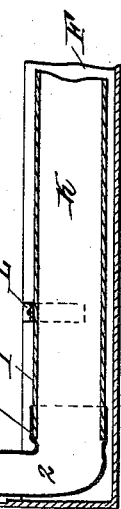
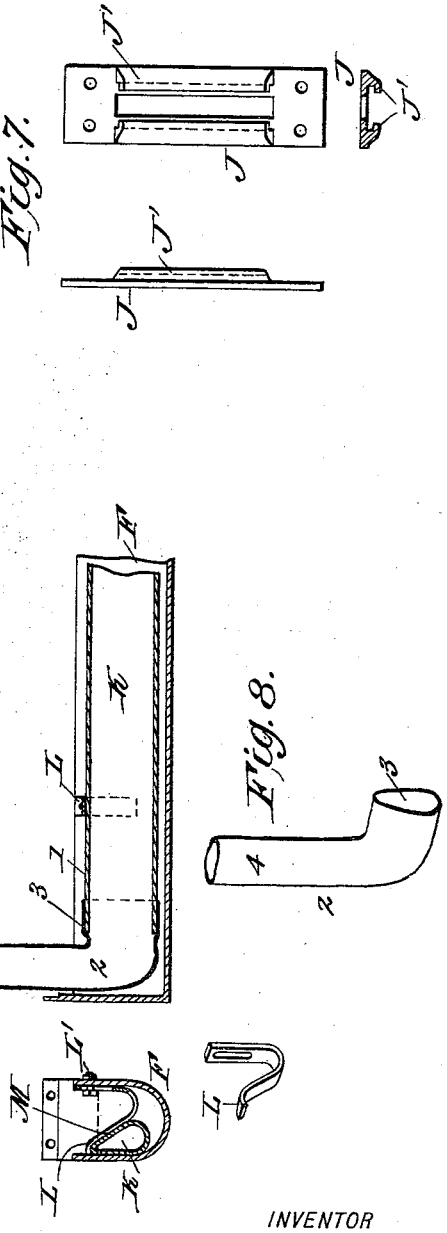
WITNESSES:
INVENTOR
Nathan L. Raber.
BY
Munn & Co
ATTORNEYS.

UNITED STATES PATENT OFFICE.

NATHAN L. RABER, OF CORVALLIS, OREGON.

AMALGAMATOR.

SPECIFICATION forming part of Letters Patent No. 536,893, dated April 2, 1895.

Application filed May 24, 1894. Serial No. 512,315. (No model.)

*To all whom it may concern:*

Be it known that I, NATHAN L. RABER, of Corvallis, in the county of Benton and State of Oregon, have invented a new and useful Improvement in Amalgamators, of which the following is a specification.

This invention is an improvement in amalgamators and particularly in that class of such apparatus illustrated in my Patent No. 497,603, dated May 16, 1893, and No. 517,767, dated April 3, 1894, and the present invention consists in certain novel constructions, combinations and arrangements of parts as will be hereinafter described and pointed out in the claims.

In the drawings—Figure 1 is a side view partly broken in section of my improved amalgamator. Fig. 2 is a cross section on about line 2—2 of Fig. 3. Fig. 3 is a partial top plan view of the amalgamator. Fig. 4 represents several parts in detail and detached. Fig. 5 illustrates the step bracket in detail. Fig. 6 presents the mercury cup or trough and the cell in cross and longitudinal section. Fig. 7 presents the socket brackets in detail, and Fig. 8 is a detail view of the flexible elbow detached.

In my present invention the amalgamator has its frame formed with sides A A and the steps are made with the step brackets B and step plates C. These brackets B are made ⌐ shape in cross section with the risers $b$ and the upper and lower wings $b'$ $b^2$. The riser is cut out at $b^3$ to reduce weight without materially weakening the bracket and the wings $b'$ $b^2$ are also cut out at B' and B² lug like portions remaining and having the bolt holes D for the fastening bolts which secure the plates C in place.

On the under side of the bracket B are formed rib like flanges E which give rigidity to it and also afford thicker and stronger bearings for the screws or bolts which fasten the step plates in place.

It will be seen that the step plates C may be removed each independent of the other.

As in my former patent the copper plates are bolted to the step plates, the latter and the brackets being preferably formed of steel.

The mercury cups or troughs F are arranged above the steps and are supported by hangers G which connect adjustably at $g$ with vertically adjustable slides H supported by the framing as presently described. This trough F as in my former patent, No. 517,767, has an overflow or level regulating outlet pipe F' which passes through and is vertically adjustable in a slot $f$ cut in the side of the frame the outer end of such pipe F' being fitted in a carrier slide F². This carrier slide F² and the slide H also the slide I which supports the mercury feeder I' are held and are movable vertically in socket brackets J secured to the frame sides and adapted to secure such slides thereto. These brackets J have flange plates J' which overlap the slides fitted in them and clamping devices consisting of clamp nuts or screws as shown at J² serve to secure the slides in any vertical adjustment. These socket or guide brackets J are preferred because they form a simple and convenient means of securing the slides such means being provided entirely outside of the frame.

As in my former patent, No. 517,767, I provide a cell in the mercury cup which in practice contains agents by the electrolysis of which the mercury is cleaned or purified and also electrical connections with the conductor in said cell and with the mercury in the cup. As the electrical connections may be the same in the present invention as in my said former patent they need not be specifically described herein, but there are certain improvements in the cell which I will now describe.

The cell K is made approximately pear shape and is held in position in the trough by copper straps L secured at one end passed over the top of the cell curved downward through the mercury and then up against the inside face of the trough and secured thereto by a bolt L' passed through a slot cut longitudinally in the strap so the cell may be raised or lowered in the mercury as desired. The cells are so adjusted that their upper edges project slightly above the level of the mercury. The purpose of this projection is in order that the liberated gases the result of the electrical influences on the solution in the cell, as soon as they pass through the cell may rise to the surface of the mercury and along the outer inclined face M of the cell which is the line of least resistance. This prevents the gases from bubbling up through the body of and disturbing the mercury.

The cell is made with a main section 1 and an end section 2. This latter is formed of flexible material and is preferably detachable. In practice I find it desirable to make the end section 2 of elastic flexible rubber so its wing 3 can be stretched over and readily applied to and removed from the main section. As shown the end section is formed with the wing 3 which may be termed the connecting wing, and the upright wing 4 the latter extending upward above the mercury cup. This construction is important in many respects. It avoids the danger of breakage incident to a cell having an integral upwardly projected end wing and also facilitates the introduction of the lead as the flexible elbow can be turned down into alignment with the main section when the conductors may be conveniently introduced or removed.

The gate N is composed of a flat copper plate having along its back a steel brace bar N' riveted to it and adapted to give it the desired rigidity. At its ends the gate is provided with hangers O which are bolted at O' to the vertical arm P' of a bracket P the horizontal arm P² of which is bolted to the block Q. The arms P' and P² both have longitudinal slots $p'$ and $p^2$ for the bolts so the brackets can be set back and forth on the blocks Q and the gate hangers can be set up or down and it will also be understood that the gate may be given a radial adjustment about its connection at O' with the bracket.

The blocks Q form a side guide to the flow of pulp on the plates so it will clear the rubber elbows at the ends of the porous cells. These blocks Q are formed with inclines $q$ tending to direct the pulp without any clogging.

Having thus described my invention, what I claim as new, and desire to secure by Letters Patent, is—

1. An improved amalgamator comprising the frame, the step brackets extended longitudinally between and supported by the sides of the frame and formed with the step risers, the step plates made separate at both edges from and extended between and supported at such edges on the adjacent step brackets, and the mercury receptacles arranged above said steps all substantially as and for the purposes set forth.

2. In an amalgamator the combination with the frame of the step brackets having risers and provided on their under side with rib like flanges and having bolt holes formed therethrough, the step plates secured to said brackets by bolts passed through said rib like flanges, and the mercury receptacles.

3. In an amalgamator the combination of the mercury cup the cell therein having its side facing the body of mercury inclined rearwardly toward its upper end and electrical connections with the contents of the cup and cell substantially as set forth.

4. The combination in an amalgamator of the mercury cup or trough, a tube or cell in said trough and extended at its upper edge above the level of the mercury in the cup, and electrical connections with the contents of the cell and cup substantially as set forth.

5. In an amalgamator an electrolytic cell having a detachable end section substantially as described.

6. In an amalgamator an electrolytic cell provided with an end section formed of flexible material substantially as shown and described.

7. In an amalgamator an electrolytic cell provided with a detachable end section formed of flexible material substantially as shown and described.

8. In an amalgamator an electrolytic cell provided with a detachable flexible end section formed with a wing fitted to the body of the cell and with an upright wing substantially as set forth.

9. In an amalgamator an end section for the cell composed of flexible material and formed with the connecting and upright wings substantially as set forth.

10. The combination in an amalgamator with the mercury cup or trough of the cell therein and the retaining strips of copper extended over the cell and having one end adjustably secured whereby the cell may be raised or lowered in the mercury substantially as set forth.

11. In an amalgamator the combination with the mercury cup or trough, of the cell made approximately pear shape in cross section and arranged in said cup with its upper edge extended above the mercury level and having the flexible end section having a wing fitting the end of the main cell section and an upright wing substantially as and for the purposes set forth.

12. The combination with the frame and the steps of the mercury cups or troughs, the gates thereover and provided with end hangers, the brackets to which said end hangers are adjustably connected and the guide blocks supporting said brackets substantially as set forth.

13. In an amalgamator the combination with the steps and the mercury cups thereon of the guide blocks secured on the steps and having the inner edges of their upper ends inclined substantially as and for the purposes set forth.

14. In an amalgamator the combination of the mercury cups the cells therein provided at their ends with flexible sections devices for securing the cells in place in the cups and electrical connections with the contents of the cup and cell substantially as set forth.

15. The combination in an amalgamator of the steps, the mercury cups or troughs, the guide blocks secured on the steps, the L-shaped brackets having one wing connected adjustably with the guide blocks and the gate having hangers connected adjustably with the other arms of the brackets substantially as and for the purposes set forth.

NATHAN L. RABER.

Witnesses:
W. S. McFADDEN,
JAS. A. CAWTHORN.